US010129832B2

(12) United States Patent
Ruan

(10) Patent No.: US 10,129,832 B2
(45) Date of Patent: Nov. 13, 2018

(54) WIRELESS COMMUNICATION CONTROL METHOD AND WIRELESS NETWORK DEVICE

(71) Applicant: Huawei Technologies Co., Ltd., Shenzhen (CN)

(72) Inventor: Wei Ruan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 15/274,800

(22) Filed: Sep. 23, 2016

(65) Prior Publication Data
US 2017/0013560 A1    Jan. 12, 2017

Related U.S. Application Data
(63) Continuation of application No. PCT/CN2015/074701, filed on Mar. 20, 2015.

(30) Foreign Application Priority Data
Mar. 26, 2014    (CN) .......................... 2014 1 0118089

(51) Int. Cl.
H04W 52/02    (2009.01)
H04L 12/26    (2006.01)
(Continued)

(52) U.S. Cl.
CPC ......... *H04W 52/0258* (2013.01); *H04L 43/16* (2013.01); *H04W 52/0245* (2013.01);
(Continued)

(58) Field of Classification Search
None
See application file for complete search history.

(56) References Cited

U.S. PATENT DOCUMENTS

2004/0001429 A1    1/2004 Ma et al.
2005/0180311 A1    8/2005 Wang et al.
(Continued)

FOREIGN PATENT DOCUMENTS

CN    1371197 A    9/2002
CN    1663213 A    8/2005
(Continued)

Primary Examiner — Robert C Scheibel
(74) Attorney, Agent, or Firm — Leydig, Voit & Mayer, Ltd.

(57) ABSTRACT

A wireless communication control method and apparatus are provided. The method includes: receiving, by a wireless network device in a first frequency band, a first probe request frame sent by a terminal, and receiving, in a second frequency band, a second probe request frame sent by the terminal, where a quantity of non-overlapping channels in the first frequency band is less than that in the second frequency band; and a first transmit power of the wireless network device in the first frequency band is lower than a second transmit power of the wireless network device in the second frequency band; preferentially responding, by the wireless network device, to the first probe request frame at the first transmit power if a signal transmission strength of the terminal is greater than a preset strength. Co-channel interference in an operating frequency band including a relatively small quantity of non-overlapping channels is reduced.

10 Claims, 4 Drawing Sheets

(51) Int. Cl.
*H04W 72/04* (2009.01)
*H04W 52/24* (2009.01)
*H04W 52/14* (2009.01)
*H04W 52/34* (2009.01)
*H04W 52/50* (2009.01)
*H04W 84/12* (2009.01)

(52) U.S. Cl.
CPC ....... *H04W 52/143* (2013.01); *H04W 52/245* (2013.01); *H04W 52/246* (2013.01); *H04W 52/343* (2013.01); *H04W 52/50* (2013.01); *H04W 72/0453* (2013.01); *H04W 84/12* (2013.01); *Y02D 70/00* (2018.01); *Y02D 70/142* (2018.01)

(56) References Cited

U.S. PATENT DOCUMENTS

| | | |
|---|---|---|
| 2009/0017838 A1 | 1/2009 | Laroia et al. |
| 2011/0235591 A1* | 9/2011 | Iyer ....................... H04L 5/0064 370/328 |
| 2011/0261797 A1 | 10/2011 | Yamaguchi |
| 2012/0275320 A1* | 11/2012 | Iyer ....................... H04W 16/14 370/252 |
| 2012/0287783 A1* | 11/2012 | Kuhn ................... H04W 16/08 370/230 |
| 2012/0322481 A1* | 12/2012 | Laroche ............... H04W 48/16 455/509 |
| 2015/0117348 A1 | 4/2015 | Takano et al. |
| 2017/0070976 A1 | 3/2017 | Shirakawa |
| 2017/0171870 A1* | 6/2017 | Wang .................. H04W 72/085 |

FOREIGN PATENT DOCUMENTS

| | | |
|---|---|---|
| CN | 1918874 A | 2/2007 |
| CN | 101175322 A | 5/2008 |
| CN | 101690343 A | 3/2010 |
| CN | 101835098 A | 9/2010 |
| CN | 102256337 A | 11/2011 |
| JP | 2011188122 A | 9/2011 |
| JP | 2011234079 A | 11/2011 |
| JP | 2015170977 A | 9/2015 |
| WO | WO 2013168467 A1 | 11/2013 |

\* cited by examiner

WIRELESS COMMUNICATION CONTROL METHOD AND WIRELESS NETWORK DEVICE

CROSS-REFERENCE TO RELATED APPLICATIONS

This application is a continuation of International Application No. PCT/CN2015/074701, filed on Mar. 20, 2015, which claims priority to Chinese Patent Application No. 201410118089.1, filed on Mar. 26, 2014. The disclosures of the aforementioned applications are hereby incorporated by reference in their entireties.

TECHNICAL FIELD

This application relates to the field of communications technologies, and in particular, to a wireless communication control method and apparatus.

BACKGROUND

In an existing wireless local area network, operating frequency bands are mainly classified into 2.4 gigahertz (GHz) and 5 GHz, and each frequency band is divided into several channels. When a terminal performs wireless communication with a wireless network device, the terminal may send a Probe Request frame in each operating frequency band supported by the terminal; after receiving the Probe Request frames, the wireless network device responds to a Probe Request frame of an operating frequency band, and sends a Probe Response frame to the terminal in the operating frequency band; and after receiving the Probe Response frame, the terminal can perform wireless communication with the wireless network device by using the operating frequency band.

In the prior art, an operating frequency band in which a wireless network device responds to a Probe Request frame is determined according to a load status of the wireless network device in the operating frequency band.

However, different operating frequency bands include different quantities of non-overlapping channels. A non-overlapping channel refers to a channel that does not overlap with another channel. For an operating frequency band including a relatively small quantity of non-overlapping channels, when a terminal performs wireless communication with a wireless network device, co-channel interference is relatively serious.

SUMMARY

This application provides a wireless communication control method and apparatus, to reduce co-channel interference in an operating frequency band including a relatively small quantity of non-overlapping channels.

To achieve the foregoing objective, this application provides the following technical solutions.

According to a first aspect, a wireless communication control method is provided, including:

receiving, by a wireless network device in a first frequency band, a first probe request frame sent by a terminal, and receiving, in a second frequency band, a second probe request frame sent by the terminal, where a quantity of non-overlapping channels in the first frequency band is less than a quantity of non-overlapping channels in the second frequency band; and a first transmit power of the wireless network device in the first frequency band is lower than a second transmit power of the wireless network device in the second frequency band;

preferentially responding, by the wireless network device, to the first probe request frame at the first transmit power if a signal transmission strength of the terminal is greater than a preset strength; and preferentially responding, by the wireless network device, to the second probe request frame at the second transmit power if the signal transmission strength of the terminal is less than the preset strength.

In a first possible implementation manner of the first aspect, the preferentially responding, by the wireless network device, to the first probe request frame at the first transmit power if a signal transmission strength of the terminal is greater than a preset strength includes:

responding, by the wireless network device, to the first probe request frame at the first transmit power if the signal transmission strength of the terminal is greater than the preset strength and load of the wireless network device in the first frequency band is less than a first preset threshold.

With reference to the first aspect or the first possible implementation manner of the first aspect, in a second possible implementation manner of the first aspect, the preferentially responding, by the wireless network device, to the second probe request frame at the second transmit power if the signal transmission strength of the terminal is less than the preset strength includes:

responding, by the wireless network device, to the second probe request frame at the second transmit power if the signal transmission strength of the terminal is less than the preset strength and load of the wireless network device in the second frequency band is less than a second preset threshold.

With reference to any one of the first aspect, the first possible implementation manner of the first aspect, and the second possible implementation manner of the first aspect, in a third possible implementation manner of the first aspect, the method further includes:

when the load of the wireless network device in the first frequency band is greater than or equal to the first preset threshold and the load of the wireless network device in the second frequency band is less than the second preset threshold, selecting a terminal that supports the second frequency band and whose signal transmission strength is the smallest from terminals connected to the first frequency band of the wireless network device, to put the terminal offline; and when the load of the wireless network device in the second frequency band is greater than or equal to the second preset threshold and the load of the wireless network device in the first frequency band is less than the first preset threshold, selecting a terminal that supports the first frequency band and whose signal transmission strength is the greatest from terminals connected to the second frequency band of the wireless network device, to put the terminal offline; and after the receiving, by a wireless network device in a first frequency band, a first probe request frame sent by a terminal, and receiving, in a second frequency band, a second probe request frame sent by the terminal, the method further includes:

when the terminal is a terminal that is put offline in the first frequency band, responding to the second probe request frame; and when the terminal is a terminal that is put offline in the second frequency band, responding to the first probe request frame.

With reference to any one of the first aspect and the first possible implementation manner to the third possible implementation manner of the first aspect, in a fourth possible implementation manner of the first aspect, after the receiving, by a wireless network device in a first frequency band, a first probe request frame sent by a terminal, when the second probe request frame sent by the terminal in the second frequency band is not received within a preset time period, the method further includes:

responding to the first probe request frame at a third transmit power if the signal transmission strength of the terminal is less than the preset strength, where the third transmit power is higher than the first transmit power.

According to a second aspect, a wireless communication control apparatus is provided, including:

a first receiving module, configured to receive, in a first frequency band, a first probe request frame sent by a terminal;

a second receiving module, configured to receive, in a second frequency band, a second probe request frame sent by the terminal, where a quantity of non-overlapping channels in the first frequency band is less than a quantity of non-overlapping channels in the second frequency band;

a first responding module, configured to preferentially respond to the first probe request frame at the first transmit power if a signal transmission strength of the terminal is greater than a preset strength; and a second responding module, configured to preferentially respond to the second probe request frame at the second transmit power if the signal transmission strength of the terminal is less than the preset strength, where the first transmit power is lower than the second transmit power.

In a first possible implementation manner of the second aspect, the first responding module is specifically configured to respond to the first probe request frame at the first transmit power if the signal transmission strength of the terminal is greater than the preset strength and load in the first frequency band is less than a first preset threshold.

With reference to the second aspect or the first possible implementation manner of the second aspect, in a second possible implementation manner of the second aspect, the second responding module is specifically configured to respond to the second probe request frame at the second transmit power if the signal transmission strength of the terminal is less than the preset strength and load in the second frequency band is less than a second preset threshold.

The second responding module is specifically configured to respond to the second probe request frame at the second transmit power if the signal transmission strength of the terminal is less than the preset strength and load in the second frequency band is less than a second preset threshold.

With reference to any one of the second aspect, the first possible implementation manner of the second aspect, and the second possible implementation manner of the second aspect, in a third possible implementation manner of the second aspect, the apparatus further includes:

a first put-offline module, configured to: when the load in the first frequency band is greater than or equal to the first preset threshold and the load in the second frequency band is less than the second preset threshold, select a terminal that supports the second frequency band and whose signal transmission strength is the smallest from terminals connected to the first frequency band, to put the terminal offline;

a second put-offline module, configured to: when the load in the second frequency band is greater than or equal to the second preset threshold and the load in the first frequency band is less than the first preset threshold, select a terminal that supports the first frequency band and whose signal transmission strength is the greatest from terminals connected to the second frequency band, to put the terminal offline;

a third responding module, configured to: when the first receiving module receives the first probe request frame of the terminal and the second receiving module receives the second probe request frame of the terminal, if the terminal is a terminal that is put offline in the first frequency band, respond to the second probe request frame; and a fourth responding module, configured to: when the first receiving module receives the first probe request frame of the terminal and the second receiving module receives the second probe request frame of the terminal, if the terminal is a terminal that is put offline in the second frequency band, respond to the first probe request frame.

With reference to any one of the second aspect and the first possible implementation manner to the third possible implementation manner of the second aspect, in a fourth possible implementation manner of the second aspect, the apparatus further includes:

a fifth responding module, configured to: after the first receiving module receives, in the first frequency band, the first probe request frame sent by the terminal, when the second receiving module does not receive, within a preset time period, the second probe request frame sent by the terminal in the second frequency band, respond to the first probe request frame at a third transmit power if the signal transmission strength of the terminal is less than the preset strength, where the third transmit power is higher than the first transmit power.

In conclusion, this application provides a wireless communication control method and apparatus. A wireless network device receives, in a first frequency band, a first probe request frame sent by a terminal, and receives, in a second frequency band, a second probe request frame sent by the terminal, where a quantity of non-overlapping channels in the first frequency band is less than a quantity of non-overlapping channels in the second frequency band, and a first transmit power of the wireless network device in the first frequency band is lower than a second transmit power of the wireless network device in the second frequency band, so that coverage of the wireless network device in the first frequency band is smaller than coverage of the wireless network device in the second frequency band; when a signal transmission strength of the terminal is less than a preset strength, that is, when the terminal is relatively far away from the wireless network device, the wireless network device preferentially responds to the second probe request frame; and when the signal transmission strength of the terminal is greater than the preset strength, that is, when the terminal is relatively near the wireless network device, the wireless network device preferentially responds to the first probe request frame. Because the first frequency band includes a relatively small quantity of non-overlapping channels, a distance between wireless network devices that use a same channel in the first frequency band is short. The transmit power of the wireless network device in the first frequency band is low, which helps reduce co-channel interference between the wireless network devices. In addition, the sufficiently large coverage in the second frequency band ensures that a user normally uses a wireless local area network.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely embodiments of this application, and a person of ordinary skill in the art may still derive other drawings from these accompanying drawings without creative efforts.

DESCRIPTION OF EMBODIMENTS

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The embodiments of this application include:

a wireless network device receives, in a first frequency band, a first probe request frame sent by a terminal, and receives, in a second frequency band, a second probe request frame sent by the terminal, where a quantity of non-overlapping channels in the first frequency band is less than a quantity of non-overlapping channels in the second frequency band, and a first transmit power of the wireless network device in the first frequency band is lower than a second transmit power of the wireless network device in the second frequency band; when a signal transmission strength of the terminal is less than a preset strength, that is, when the terminal is relatively far away from the wireless network device, the wireless network device preferentially responds to the second probe request frame; and when the signal transmission strength of the terminal is greater than the preset strength, that is, when the terminal is relatively near the wireless network device, the wireless network device preferentially responds to the first probe request frame. Because the first frequency band includes a relatively small quantity of non-overlapping channels, a distance between wireless network devices that use a same channel in the first frequency band is short. The transmit power of the wireless network device in the first frequency band is low, which helps reduce co-channel interference between the wireless network devices. In addition, the sufficiently large coverage in the second frequency band ensures that a user can normally use a wireless local area network.

The technical solutions in this application are described in detail below with reference to the accompanying drawings.

Figure 1:
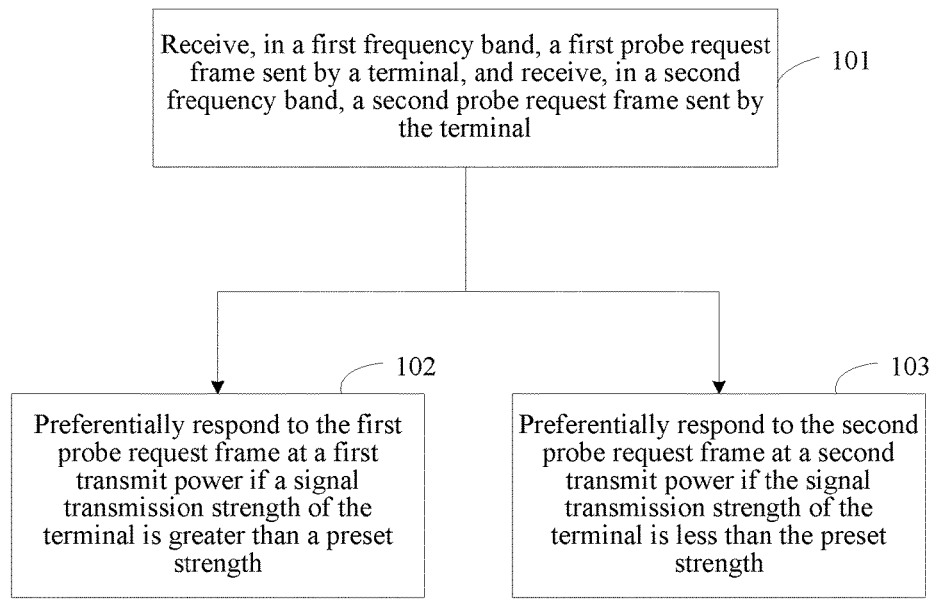
FIG. 1 is a flowchart of an embodiment of a wireless communication control method according to an embodiment of this application.

FIG. 1 is a flowchart of an embodiment of a wireless communication control method according to an embodiment of this application. The method may include the following steps:

101: A wireless network device receives, in a first frequency band, a first probe request frame sent by a terminal, and receives, in a second frequency band, a second probe request frame sent by the terminal.

A quantity of non-overlapping channels in the first frequency band is less than a quantity of non-overlapping channels in the second frequency band.

The terminal can support multiple frequency bands, and the first frequency band and the second frequency band may be any two frequency bands among the multiple frequency bands.

In this embodiment of this application, at least a radio frequency module (RF module) supporting the first frequency band and a radio frequency module supporting the second frequency band are configured in the wireless network device, so as to respectively receive signals from the first frequency band and the second frequency band.

The wireless network device may refer to a wireless access point (AP) in a wireless local area network system.

In a wireless local area network (WLAN), operating frequency bands are mainly classified into 2.4 GHz and 5 GHz. In this embodiment of this application, the first frequency band may refer to a 2.4 GHz operating frequency band, and the second frequency band may refer to a 5 GHz operating frequency band.

In a 2.4 GHz frequency band in a WLAN, a quantity of non-overlapping channels is 3. In a 5 GHz frequency band, according to provisions in laws of different countries, a quantity of non-overlapping channels is generally over ten or twenty and far greater than the quantity of non-overlapping channels in the 2.4 GHz frequency band.

A probe request frame is signaling that is sent when the terminal proactively performs scanning. The first probe request frame is a probe request frame sent by the terminal in the first frequency band, and the second probe request frame is a probe request frame sent by the terminal in the second frequency band. The radio frequency module supporting the first frequency band and the radio frequency module supporting the second frequency band that are in the wireless network device can respectively receive the first probe request frame and the second probe request frame.

102: The wireless network device preferentially responds to the first probe request frame at a first transmit power if a signal transmission strength of the terminal is greater than a preset strength.

103: The wireless network device preferentially responds to the second probe request frame at a second transmit power if the signal transmission strength of the terminal is less than the preset strength.

A first transmit power of the wireless network device in the first frequency band is lower than a second transmit power of the wireless network device in the second frequency band, so that coverage of the wireless network device in the first frequency band is smaller than coverage of the wireless network device in the second frequency band.

The coverage of the wireless network device in the first frequency band refers to an area in which a signal strength of the wireless network device in the first frequency band is greater than a specific threshold. The coverage of the wireless network device in the second frequency band refers to an area in which a signal strength of the wireless network device in the second frequency band is greater than a specific threshold.

If the signal transmission strength of the terminal is equal to the preset strength, the wireless network device may preferentially respond to the first probe request frame at the first transmit power, or preferentially respond to the second probe request frame at the second transmit power.

The preferentially responding to the first probe request frame includes directly responding to the first probe request frame or responding to the first probe request frame under a specific condition.

The preferentially responding to the second probe request frame includes directly responding to the second probe request frame or responding to the second probe request frame under a specific condition.

The responding to the first probe request frame includes sending a probe response frame to the terminal in the first frequency band, and the responding to the second probe request frame includes sending a probe response frame to the terminal in the second frequency band.

The signal transmission strength of the terminal may specifically refer to a signal strength of the first probe request frame or a signal strength of the second probe request frame. The signal strength of the first probe request frame and the signal strength of the second probe request frame respectively correspond to different preset strengths.

The signal transmission strength of the terminal may be determined according to an received signal strength indicator (RSSI) of the first probe request frame or the second probe request frame.

The quantity of non-overlapping channels in the first frequency band is less than the quantity of non-overlapping channels in the second frequency band; therefore, a distance between wireless network devices that use a same channel in the first frequency band is relatively short, and co-channel interference in the first frequency band is relatively serious. An example in which the first frequency band is a 2.4 GHz operating frequency band and the second frequency band is a 5 GHz operating frequency band is used. A quantity of non-overlapping channels in the 2.4 GHz operating frequency band is less than a quantity of non-overlapping channels in the 5 GHz operating frequency band. In the 2.4 GHz operating frequency band, a distance between wireless network devices that use a same channel is 1.732 times a distance between adjacent wireless network devices. In the 5 GHz operating frequency band, in America, a distance between wireless network devices that use a same channel is at least 2.65 times a distance between adjacent wireless network devices, or higher in a well-planned network. Therefore, in the 2.4 GHz operating frequency band, co-channel interference is relatively serious.

In this embodiment, the first transmit power of the wireless network device in the first frequency band is low, which helps reduce co-channel interference between wireless network devices. In addition, when the signal transmission strength of the terminal is less than the preset strength, that is, when the terminal is relatively far away from the wireless network device, the wireless network device preferentially responds to the second probe request frame; when the signal transmission strength of the terminal is greater than the preset strength, that is, when the terminal is relatively near the wireless network device, the wireless network device preferentially responds to the first probe request frame. Because the second transmit power in the second frequency band is higher than the first transmit power, coverage of the wireless network device in the second frequency band is larger. Therefore, a relatively distant terminal can be connected to the second frequency band of the wireless network device, which ensures that a user normally uses a wireless local area network.

The wireless network device may pre-configure the first transmit power in the first frequency band and the second transmit power in the second frequency band, so that the coverage in the first frequency band is smaller than the coverage in the second frequency band. In a possible implementation manner, if there is no obstacle, a difference between the second transmit power and the first transmit power is approximately 6 decibels (dBs). In this case, the coverage in the first frequency band is approximately half the coverage in the second frequency band and is within the coverage in the second frequency band, which can further reduce co-channel interference in the first frequency band in the possible implementation manner.

In this embodiment of this application, a distance between the terminal and the wireless network device may be determined according to a result of comparing the signal transmission strength of the terminal with the preset strength. For a terminal relatively near the wireless network device, the wireless network device preferentially responds with a first probe response frame; for a terminal relatively far away from the wireless network device, the wireless network device preferentially responds with a second probe response frame.

In another possible implementation manner, a distance between the terminal and the wireless network device may be determined according to a time delay of a signal of the terminal. When the time delay of the received signal of the terminal is greater than a preset value, it may be determined that the terminal is relatively far away from the wireless network device, and therefore, the wireless network device preferentially responds with a first probe response frame; when the time delay of the received signal of the terminal is less than the preset value, it may be determined that the terminal is relatively near the wireless network device, and therefore, the wireless network device preferentially responds with a second probe response frame.

In the embodiment shown in FIG. 1, in step 102, the preferentially responding, by the wireless network device, to the first probe request frame at a first transmit power if a signal transmission strength of the terminal is greater than a preset strength may include:

responding to the first probe request frame at the first transmit power if the signal transmission strength of the terminal is greater than the preset strength and load of the wireless network device in the first frequency band is less than a first preset threshold.

That is, a possible implementation manner for preferentially responding to the first probe request frame at the first transmit power is:

responding to the first probe request frame at the first transmit power when the signal transmission strength of the terminal is greater than the preset strength and load of the wireless network device in the first frequency band is less than a first preset threshold.

In this way, the load of the wireless network device in the first frequency band does not exceed a limit, to ensure communication quality; and co-channel interference in the first frequency band is reduced.

In addition, in the embodiment shown in FIG. 1, in step 103, the preferentially responding, by the wireless network device, to the second probe request frame at a second transmit power if the signal transmission strength of the terminal is less than the preset strength may include:

responding to the second probe request frame at the second transmit power if the signal transmission strength of the terminal is less than the preset strength and the load of the wireless network device in the second frequency band is less than the second preset threshold.

That is, a possible implementation manner for preferentially responding to the second probe request at the second transmit power is:

directly responding to the second probe request frame at the second transmit power when the signal transmission strength of the terminal is less than the preset strength and load of the wireless network device in the second frequency band is less than a second preset threshold.

In this way, the load of the wireless network device in the second frequency band does not exceed a limit, to ensure communication quality; and the coverage in the second frequency band is relatively large, which ensures that a user can normally use a wireless local area network.

In the foregoing possible implementation manner, when the load of the wireless network device in the first frequency band is greater than the first preset threshold and the load of the wireless network device in the second frequency band is less than the second preset threshold, the wireless network device may preferentially respond to the second probe request frame, to ensure that a user normally uses a wireless local area network.

When the load of the wireless network device in the first frequency band is less than the first preset threshold and the load of the wireless network device in the second frequency band is greater than the second preset threshold, the wireless network device may preferentially respond to the first probe request frame, to ensure that a user normally uses a wireless local area network.

Figure 2:
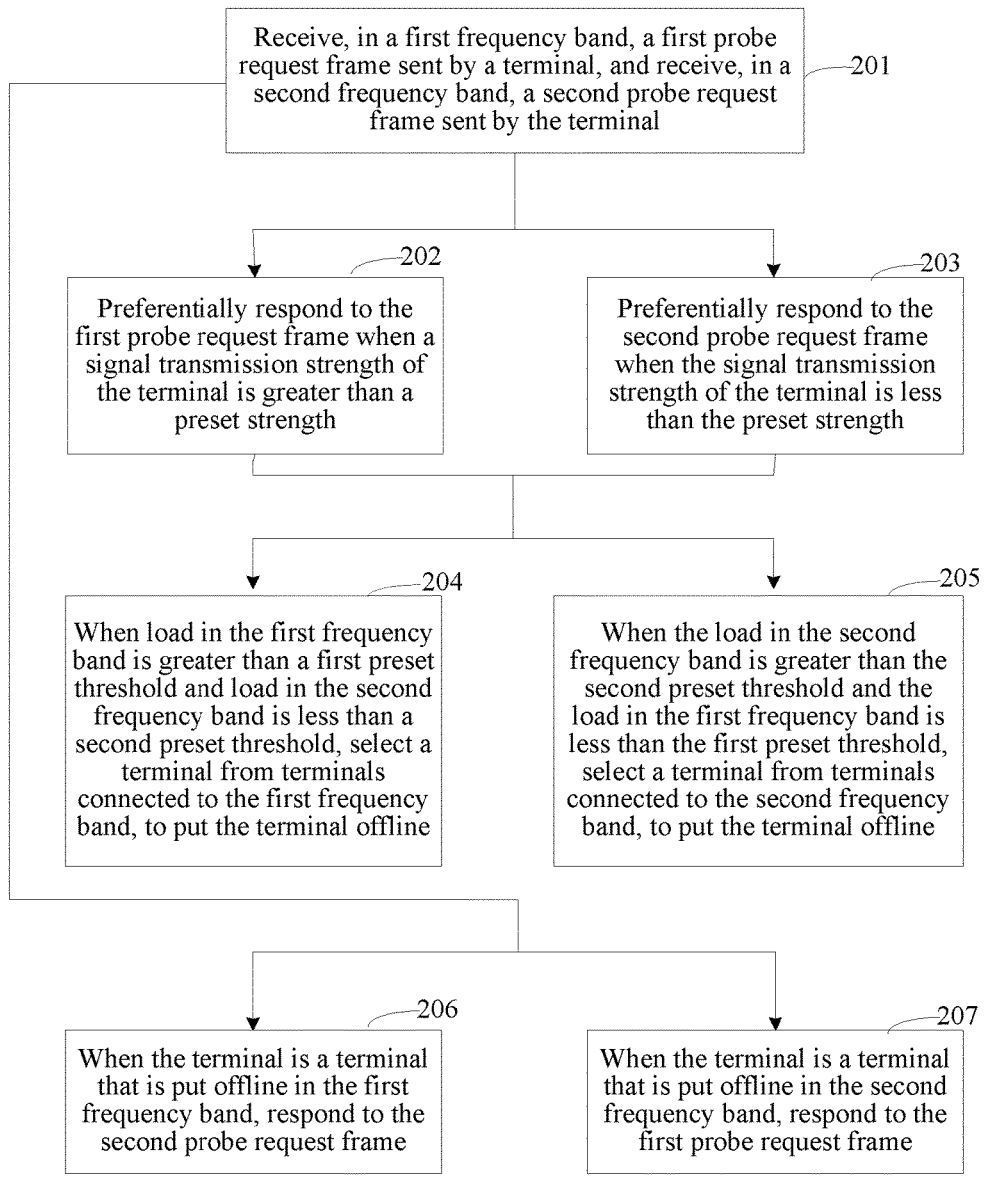
FIG. 2 is a flowchart of another embodiment of a wireless communication control method according to an embodiment of this application.

When the load of the wireless network device in the first frequency band is greater than the first preset threshold or the load of the wireless network device in the second frequency band is greater than the second preset threshold, to improve communication quality, this application further provides another embodiment of a wireless communication control method. As shown in FIG. 2, the method may include the following steps:

201: A wireless network device receives, in a first frequency band, a first probe request frame sent by a terminal, and receives, in a second frequency band, a second probe request frame sent by the terminal.

Step 201 is similar to step 101, and is not described repeatedly herein.

202: The wireless network device preferentially responds to the first probe request frame at a first transmit power if a signal transmission strength of the terminal is greater than the preset strength.

Specifically, step 202 may be responding to the first probe request frame at the first transmit power if the signal transmission strength of the terminal is greater than the preset strength and load of the wireless network device in the first frequency band is less than a first preset threshold.

203: Preferentially respond to the second probe request frame at a second transmit power if the signal transmission strength of the terminal is less than the preset strength.

Specifically, step 203 may be directly responding to the second probe request frame at the second transmit power when the signal transmission strength of the terminal is less than the preset strength and load of the wireless network device in the second frequency band is less than a second preset threshold.

204: When load of the wireless network device in the first frequency band is greater than a first preset threshold and load of the wireless network device in the second frequency band is less than a second preset threshold, select a terminal that supports the second frequency band and whose signal transmission strength is the smallest from terminals connected to the first frequency band of the wireless network device, to put the terminal offline.

Because a terminal that is put offline in the first frequency band can support the second frequency band, the terminal can be connected to the wireless network device in the second frequency band. A terminal whose signal transmission strength is the smallest, that is, a terminal relatively far away from the wireless network device, is preferentially selected as a terminal to be put offline in the first frequency band.

205: When the load of the wireless network device in the second frequency band is greater than the second preset threshold and the load of the wireless network device in the first frequency band is less than the first preset threshold, select a terminal that supports the first frequency band and whose signal transmission strength is the greatest from terminals connected to the second frequency band of the wireless network device, to put the terminal offline.

Because a terminal that is put offline in the second frequency band can support the first frequency band, the terminal can be connected to the wireless network device in the first frequency band. A terminal whose signal transmission strength is the greatest, that is, a terminal relatively near the wireless network device, is preferentially selected as a terminal to be put offline in the second frequency band.

The wireless network device may mark a terminal that is put offline, for example, save a media access control (MAC) address of the offline terminal. When the offline terminal separately sends probe request frames in the first frequency band and the second frequency band, the wireless network device may determine, according to the saved MAC address, whether the terminal is a terminal that is put offline in the first frequency band or the second frequency band, so as to directly respond to a probe request frame sent by the offline terminal in the second frequency band or the first frequency band.

When the load of the wireless network device in the first frequency band is equal to the first preset threshold and the load of the wireless network device in the second frequency band is less than the second preset threshold, a terminal that supports the second frequency band and whose signal transmission strength is the smallest may be selected from terminals connected to the first frequency band of the wireless network device, to put the terminal offline.

When the load of the wireless network device in the first frequency band is less than the first preset threshold and the load of the wireless network device in the second frequency band is equal to the second preset threshold, a terminal that supports the second frequency band and whose signal transmission strength is the smallest may be selected from terminals connected to the first frequency band of the wireless network device, to put the terminal offline.

Therefore, in this embodiment, in step 201, after the receiving, by a wireless network device in a first frequency band, a first probe request frame sent by a terminal, and receiving, in a second frequency band, a second probe request frame sent by the terminal, the method may further include:

206: When the terminal is a terminal that is put offline in the first frequency band, respond to the second probe request frame, and send a probe response frame to the offline terminal in the second frequency band according to the second transmit power.

207: When the terminal is a terminal that is put offline in the second frequency band, respond to the first probe request frame, and send a probe response frame to the offline terminal in the first frequency band according to the first transmit power.

In this embodiment, the first transmit power of the wireless network device in the first frequency band is low, which helps reduce co-channel interference between wireless network devices. In addition, when the signal transmission strength of the terminal is less than the preset strength, that is, when the terminal is relatively far away from the wireless network device, the wireless network device preferentially responds to the second probe request frame; when the signal transmission strength of the terminal is greater than the preset strength, that is, when the terminal is relatively near the wireless network device, the wireless network device preferentially responds to the first probe request frame. Because the second transmit power in the second frequency band is higher than the first transmit power, coverage of the wireless network device in the second frequency band is larger. Therefore, a relatively distant terminal can be connected to the second frequency band of the wireless network device, which ensures that a user normally uses a wireless local area network. In addition, the wireless network device monitors load statuses in the first frequency band and the second frequency band; when load in either of the frequency bands exceeds a limit, the wireless network device selects a terminal supporting the other frequency band, to put the terminal offline; and when receiving a probe request frame of the terminal that is put offline, the wireless network device may directly respond, according to an offline record, to a probe request frame sent in the other frequency band by the terminal that is put offline, thereby ensuring that a user normally uses a wireless local area network and reducing co-channel interference without affecting wireless communication.

Because the terminal may support only one operating frequency band, the wireless network device may receive a probe request frame of the terminal in only one operating frequency band. Especially when the terminal only supports the first frequency band, if the signal transmission strength of the terminal is less than the preset strength, that is, the terminal is relatively far away from the wireless network device, to ensure that the wireless local area network can be normally used, in this case, the wireless network device may respond, at a third transmit power, to the first probe request frame sent by the terminal in the first frequency band, that is, send a probe response frame to the terminal at the third transmit power. The third transmit power is higher than the first transmit power.

In addition, when the terminal is connected to the wireless network device to perform communication, a data transmit power also needs to be higher than the first transmit power.

The wireless network device may determine, according to a signal reception time interval, whether the terminal supports only one operating frequency band.

Therefore, in another embodiment, after the receiving, by a wireless network device in a first frequency band, a first probe request frame sent by a terminal, when the second probe request frame sent by the terminal in the second frequency band is not received within a preset time period, the method may further include:

when it is determined that the signal transmission strength of the terminal is less than the preset strength, sending a probe response frame to the terminal in the first frequency band according to the third transmit power.

It should be noted that the foregoing method embodiments are described as combinations of a series of actions for brief description. However, a person skilled in the art should know that this application is not limited to the described sequence of actions because some steps may be performed in another sequence or simultaneously according to this application. In addition, a person skilled in the art also should know that the embodiments described in this specification all belong to preferred embodiments, and actions and modules involved in the embodiments are not necessarily essential to this application.

Figure 3:
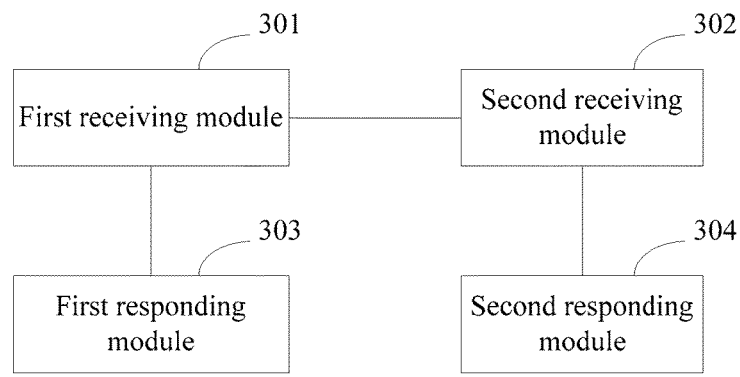
FIG. 3 is a schematic structural diagram of an embodiment of a wireless communication control apparatus according to an embodiment of this application.

FIG. 3 is a schematic structural diagram of an embodiment of a wireless communication control apparatus according to an embodiment of this application. The apparatus may include: a first receiving module 301, a second receiving module 302, a first responding module 303, and a second responding module 304.

The first receiving module 301 is configured to receive, in a first frequency band, a first probe request frame sent by a terminal.

The second receiving module 302 is configured to receive, in a second frequency band, a second probe request frame sent by the terminal.

The terminal can support multiple frequency bands, and the first frequency band and the second frequency band may be any two frequency bands among the multiple frequency bands.

The wireless communication control apparatus provided in this embodiment of this application may be integrated into a wireless network device, and the wireless network device may refer to an AP in a wireless local area network system.

The first receiving module may receive a signal from the first frequency band by using a radio frequency module that is configured in the wireless network device and that supports the first frequency band, and the second receiving module may receive a signal from the second frequency band by using a radio frequency module that is configured in the wireless network device and that supports the second frequency band.

A quantity of non-overlapping channels in the first frequency band is less than a quantity of non-overlapping channels in the second frequency band.

In a WLAN, operating frequency bands are mainly classified into 2.4 GHz and 5 GHz. In this embodiment of this application, the first frequency band supported by the first receiving module may refer to a 2.4 GHz operating frequency band, and the second frequency band supported by the second receiving module may refer to a 5 GHz operating frequency band.

The first responding module 303 is configured to preferentially respond to the first probe request frame at a first transmit power if a signal transmission strength of the terminal is greater than a preset strength.

The second responding module 304 is configured to preferentially respond to the second probe request frame at a second transmit power if the signal transmission strength of the terminal is less than the preset strength.

The first transmit power is lower than the second transmit power.

The preferentially responding to the first probe request frame includes directly responding to the first probe request frame or responding to the first probe request frame under a specific condition.

The preferentially responding to the second probe request frame includes directly responding to the second probe request frame or responding to the second probe request frame under a specific condition.

The responding to the first probe request frame includes sending a probe response frame to the terminal in the first frequency band, and the responding to the second probe request frame includes sending a probe response frame to the terminal in the second frequency band.

The signal transmission strength of the terminal may specifically refer to a signal strength of the first probe request frame or a signal strength of the second probe request frame. The signal strength of the first probe request frame and the signal strength of the second probe request frame respectively correspond to different preset strengths.

The quantity of non-overlapping channels in the first frequency band is less than the quantity of non-overlapping channels in the second frequency band; therefore, a distance between wireless network devices that use a same channel in the first frequency band is relatively short, and co-channel interference in the first frequency band is relatively serious. An example in which the first frequency band is a 2.4 GHz operating frequency band and the second frequency band is a 5 GHz operating frequency band is used. A quantity of non-overlapping channels in the 2.4 GHz operating frequency band is less than a quantity of non-overlapping channels in the 5 GHz operating frequency band. In the 2.4 GHz operating frequency band, a distance between wireless network devices that use a same channel is 1.732 times a distance between adjacent wireless network devices. In the 5 GHz operating frequency band, in America, a distance between wireless network devices that use a same channel is at least 2.65 times a distance between wireless network devices that use adjacent channels. Therefore, in the 2.4 GHz operating frequency band, co-channel interference is relatively serious.

In this embodiment, the first transmit power in the first frequency band is low, which helps reduce co-channel interference between wireless network devices. In addition, when the signal transmission strength of the terminal is less than the preset strength, that is, when the terminal is relatively far away from the wireless network device, the wireless network device preferentially responds to the second probe request frame; when the signal transmission strength of the terminal is greater than the preset strength, that is, when the terminal is relatively near the wireless network device, the wireless network device preferentially responds to the first probe request frame. Because the second transmit power in the second frequency band is higher than the first transmit power, coverage of the wireless network device in the second frequency band is larger. Therefore, a relatively distant terminal can be connected to the second frequency band, which ensures that a user normally uses a wireless local area network.

The first transmit power in the first frequency band and the second transmit power in the second frequency band may be per-configured, so that coverage of the wireless network device in the first frequency band is smaller than the coverage of the wireless network device in the second frequency band. In a possible implementation manner, if there is no obstacle, a difference between the second transmit power and the first transmit power is approximately 6 dB. In this case, the coverage in the first frequency band is approximately half the coverage in the second frequency band and is within the coverage in the second frequency band, which can further reduce co-channel interference in the first frequency band in the possible implementation manner.

In this embodiment of this application, a distance between the terminal and the wireless network device may be determined according to a result of comparing the signal transmission strength of the terminal with the preset strength. For a terminal relatively near the wireless network device, the wireless network device preferentially responds with a first probe response frame; for a terminal relatively far away from the wireless network device, the wireless network device preferentially responds with a second probe response frame.

In another possible implementation manner, a distance between the terminal and the wireless network device may be determined according to a time delay of a signal of the terminal. When the time delay of the received signal of the terminal is greater than a preset value, it may be determined that the terminal is relatively far away from the wireless network device, and therefore, the wireless network device preferentially responds with a first probe response frame; when the time delay of the received signal of the terminal is less than the preset value, it may be determined that the terminal is relatively near the wireless network device, and therefore, the wireless network device preferentially responds with a second probe response frame.

There may be multiple possible implementation manners for preferentially responding to the first probe request frame at the first transmit power. In a possible implementation manner, the first responding module may be specifically configured to respond to the first probe request frame at the first transmit power if the signal transmission strength of the terminal is greater than the preset strength and load in the first frequency band is less than a first preset threshold.

In this way, the load of the wireless network device in the first frequency band does not exceed a limit, to ensure communication quality; and co-channel interference in the first frequency band is reduced.

There may be multiple possible implementation manners for preferentially responding to the second probe request frame at the second transmit power. In a possible implementation manner, the second responding module may be specifically configured to respond to the second probe request frame at the second transmit power if the signal transmission strength of the terminal is less than the preset strength and load in the second frequency band is less than a second preset threshold.

In this way, the load of the wireless network device in the second frequency band does not exceed a limit, to ensure communication quality; and the coverage of the wireless network device in the second frequency band is relatively large, which ensures that a user can normally use a wireless local area network.

In the foregoing possible implementation manner, when the load in the first frequency band is greater than the first preset threshold and the load in the second frequency band is less than the second preset threshold, the wireless network device may preferentially respond to the second probe request frame, to ensure that a user normally uses a wireless local area network.

When the load in the first frequency band is less than the first preset threshold and the load in the second frequency band is greater than the second preset threshold, the wireless network device may preferentially respond to the first probe request frame, to ensure that a user normally uses a wireless local area network.

Figure 4:
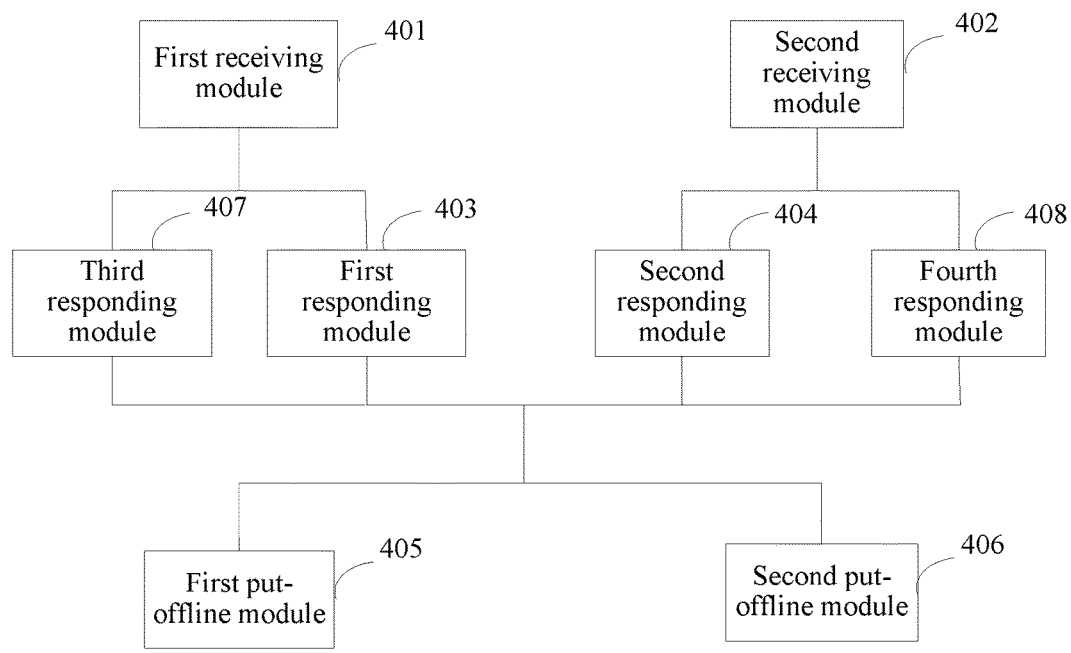
FIG. 4 is a schematic structural diagram of another embodiment of a wireless communication control apparatus according to an embodiment of this application.

When the load in the first frequency band is greater than the first preset threshold or the load in the second frequency band is greater than the second preset threshold, to improve communication quality, this application further provides another embodiment of a wireless communication control apparatus. As shown in FIG. 4, the apparatus may include:

a first receiving module 401, configured to receive, in a first frequency band, a first probe request frame sent by a terminal;

a second receiving module 402, configured to receive, in a second frequency band, a second probe request frame sent by the terminal;

a first responding module 403, configured to preferentially respond to the first probe request frame at a first transmit power if a signal transmission strength of the terminal is greater than a preset strength, where the first responding module may be specifically configured to respond to the first probe request frame at the first transmit power if the signal transmission strength of the terminal is greater than the preset strength and load in the first frequency band is less than a first preset threshold;

a second responding module 404, configured to preferentially respond to the second probe request frame at a second transmit power if the signal transmission strength of the terminal is less than the preset strength, where the second responding module may be specifically configured to respond to the second probe request frame at the second transmit power if the signal transmission strength of the terminal is less than the preset strength and load in the second frequency band is less than a second preset threshold, where the first transmit power is lower than the second transmit power;

a first put-offline module 405, configured to: when the load in the first frequency band is greater than or equal to the first preset threshold and the load in the second frequency band is less than the second preset threshold, select a terminal that supports the second frequency band and whose signal transmission strength is the smallest from terminals connected to the first frequency band, to put the terminal offline;

a second put-offline module 406, configured to: when the load in the second frequency band is greater than or equal to the second preset threshold and the load in the first frequency band is less than the first preset threshold, select a terminal that supports the first frequency band and whose signal transmission strength is the greatest from terminals connected to the second frequency band, to put the terminal offline;

a third responding module 407, configured to: when the first receiving module receives the first probe request frame of the terminal and the second receiving module receives the second probe request frame of the terminal, if the terminal is a terminal that is put offline in the first frequency band, respond to the second probe request frame; and a fourth responding module 408, configured to: when the first receiving module receives the first probe request frame of the terminal and the second receiving module receives the second probe request frame of the terminal, if the terminal is a terminal that is put offline in the second frequency band, respond to the first probe request frame.

In this embodiment, the first transmit power is low, which helps reduce co-channel interference between wireless network devices. In addition, when the signal transmission strength of the terminal is less than the preset strength, that is, when the terminal is relatively far away from the wireless network device, the wireless network device preferentially responds to the second probe request frame; when the signal transmission strength of the terminal is greater than the preset strength, that is, when the terminal is relatively near the wireless network device, the wireless network device preferentially responds to the first probe request frame. Because the second transmit power in the second frequency band is higher than the first transmit power, coverage of the wireless network device in the second frequency band is larger. Therefore, a relatively distant terminal can be connected to the second frequency band, which ensures that a user normally uses a wireless local area network. In addition, load statuses in the first frequency band and the second frequency band may be monitored; when load in either of the frequency bands exceeds a limit, a terminal supporting the other frequency band is selected to be put offline; and when receiving a probe request frame of the terminal that is put offline, the wireless network device may directly respond, according to an offline record, to a probe request frame sent in the other frequency band by the terminal that is put offline, thereby ensuring that a user normally uses a wireless local area network and reducing co-channel interference without affecting communication quality.

Because the terminal may support only one operating frequency band, a probe request frame of the terminal may be received in only one operating frequency band. Especially when the terminal only supports the first frequency band, if the signal transmission strength of the terminal is less than the preset strength, that is, the terminal is relatively far away from the wireless network device, to ensure that the wireless local area network can be normally used, in this case, the apparatus may respond, at a third transmit power, to the first probe request frame sent by the terminal in the first frequency band, that is, send a probe response frame to the terminal at the third transmit power. The third transmit power is higher than the first transmit power.

In addition, when the terminal is connected to the wireless network device to perform communication, a data transmit power also needs to be higher than the first transmit power.

It may be determined, according to a signal reception time interval, whether the terminal supports only one operating frequency band.

Therefore, in another embodiment, the wireless communication control apparatus may further include:

a fifth responding module, configured to: after the first receiving module receives, in the first frequency band, the first probe request frame sent by the terminal, when the second receiving module does not receive, within a preset time period, the second probe request frame sent by the terminal in the second frequency band, respond to the first probe request frame at a third transmit power if the signal transmission strength of the terminal is less than the preset strength, where the third transmit power is higher than the first transmit power.

In an actual application, the wireless communication control apparatus in the foregoing embodiment may be integrated into a wireless network device, and the wireless network device may be an AP in a WLAN system. The wireless network device supports at least the first frequency band and the second frequency band, and at least a radio frequency module supporting the first frequency band and a radio frequency module supporting the second frequency band are disposed in the wireless network device, so as to respectively receive signals from the first frequency band and the second frequency band.

Co-channel interference between wireless network devices in the first frequency band can be reduced by means of deployment of the wireless network device in the wireless communication control apparatus in this embodiment of this application.

Figure 5:
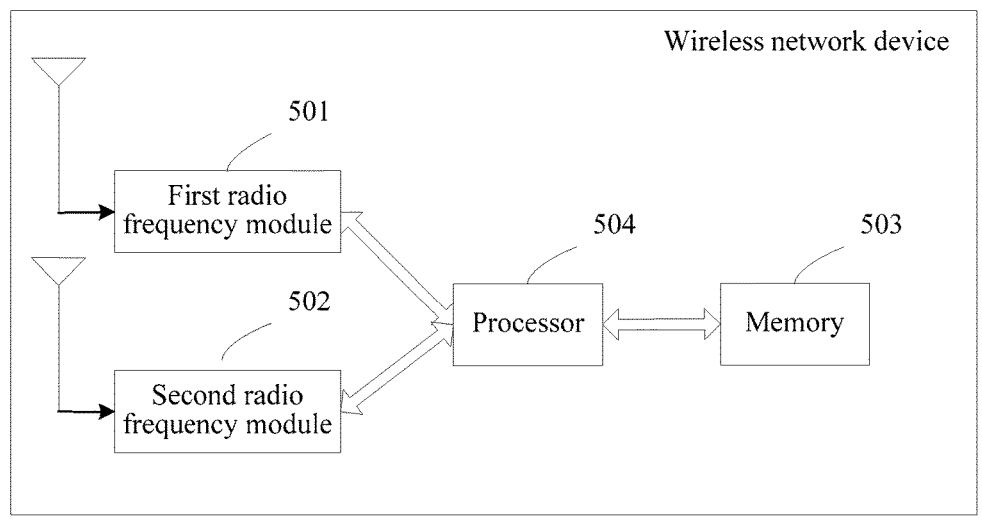
FIG. 5 is a schematic structural diagram of an embodiment of a wireless network device according to an embodiment of this application.

It may be learned from the foregoing description that, a person skilled in the art may clearly understand that this application may be implemented by means of software plus a necessary universal hardware platform. Therefore, referring to FIG. 5, an embodiment of this application further provides a wireless network device. The wireless network device includes at least a first radio frequency module 501, a second radio frequency module 502, a memory 503, and a processor 504. The first radio frequency module 501, the second radio frequency module 502, and the memory 503 are separately connected to the processor 504.

The memory 503 stores a set of program instructions. The memory may be a volatile memory, for example, a random-access memory (RAM); or a non-volatile memory, for example, a flash memory, a hard disk drive (HDD) or a solid-state drive (SSD); or a combination of the foregoing types of memories.

The processor 504 is configured to invoke the program instructions stored in the memory 503, to execute the following operations:

receiving, in a first frequency band by using the first radio frequency module 501, a first probe request frame sent by a terminal, and receiving, in a second frequency band by using the second radio frequency module 502, a second probe request frame sent by the terminal, where a quantity of non-overlapping channels in the first frequency band is less than a quantity of non-overlapping channels in the second frequency band; and a first transmit power of the wireless network device in the first frequency band is lower than a second transmit power in the second frequency band;

preferentially responding, by the wireless network device, to the first probe request frame at the first transmit power if a signal transmission strength of the terminal is greater than a preset strength; and preferentially responding, by the wireless network device, to the second probe request frame at the second transmit power if the signal transmission strength of the terminal is less than the preset strength.

The processor may be a central processing unit (CPU) or a combination of a CPU and a hardware chip. The hardware chip may be an application-specific integrated circuit (ASIC), a programmable logic device (PLD) or a combination thereof. The PLD may be a complex programmable logic device (CPLD), a field-programmable gate array (FPGA), a generic array logic (GAL), or any combination thereof The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

For ease of description, the foregoing apparatus is described by dividing the functions into various units. Certainly, when the present application is implemented, the functions of each unit may be implemented in one or more pieces of software and/or hardware.

It may be learned from description of the foregoing implementation manners that, a person skilled in the art may clearly understand that this application may be implemented by means of software plus a necessary universal hardware platform. Based on such understanding, the essence, or a part that contributes to the prior art, of the technical solutions of this application may be embodied in a form of a software product. The computer software product may be stored in a storage medium. The storage medium may be a random-access memory, a read only memory, a flash memory, a hard disk drive, a solid-state drive, a magnetic tape, a floppy disk, an optic disc, or any combination thereof. The storage medium includes several instructions used to cause the processor to execute the method described in the embodiments of this application or some parts of the embodiments.

The embodiments disclosed above are described to enable a person skilled in the art to implement or use this application. Various modifications on the embodiments are obvious to a person skilled in the art. Therefore, this application is not limited to the embodiments shown in this specification, and instead is subject to the scope of the claims.

What is claimed is:

1. A wireless communication control method, comprising:
receiving, by a wireless network device in a first frequency band, a first probe request frame sent by a terminal, and receiving, in a second frequency band, a second probe request frame sent by the terminal, wherein a quantity of non-overlapping channels in the first frequency band is less than a quantity of non-overlapping channels in the second frequency band; and a first transmit power of the wireless network device in the first frequency band is lower than a second transmit power of the wireless network device in the second frequency band;
preferentially responding, by the wireless network device, to the first probe request frame at the first transmit power if a signal transmission strength of the terminal is greater than a preset strength; and
preferentially responding, by the wireless network device, to the second probe request frame at the second transmit power if the signal transmission strength of the terminal is less than the preset strength.

2. The method according to claim 1, wherein the preferentially responding, by the wireless network device, to the first probe request frame at the first transmit power if a signal transmission strength of the terminal is greater than a preset strength comprises:
responding, by the wireless network device, to the first probe request frame at the first transmit power if the signal transmission strength of the terminal is greater than the preset strength and load of the wireless network device in the first frequency band is less than a first preset threshold.

3. The method according to claim 1, wherein the preferentially responding, by the wireless network device, to the second probe request frame at the second transmit power if the signal transmission strength of the terminal is less than the preset strength comprises:
responding, by the wireless network device, to the second probe request frame at the second transmit power if the signal transmission strength of the terminal is less than the preset strength and load of the wireless network device in the second frequency band is less than a second preset threshold.

4. The method according to claim 1, wherein the method further comprises:
selecting a terminal that supports the second frequency band and whose signal transmission strength is the smallest from terminals connected to the first frequency band of the wireless network device, to put the terminal offline, when the load of the wireless network device in the first frequency band is greater than or equal to the first preset threshold and the load of the wireless network device in the second frequency band is less than the second preset threshold; and
selecting a terminal that supports the first frequency band and whose signal transmission strength is the greatest from terminals connected to the second frequency band of the wireless network device, to put the terminal offline, when the load of the wireless network device in the second frequency band is greater than or equal to the second preset threshold and the load of the wireless network device in the first frequency band is less than the first preset threshold; and after the receiving the first probe request frame and the second probe request frame, the method further comprises:

responding to the second probe request frame, when the terminal is a terminal that is put offline in the first frequency band; and responding to the first probe request frame, when the terminal is a terminal that is put offline in the second frequency band.

5. The method according to claim 1, wherein after the receiving, by a wireless network device in a first frequency band, a first probe request frame sent by a terminal, when the second probe request frame sent by the terminal in the second frequency band is not received within a preset time period, the method further comprises:

responding to the first probe request frame at a third transmit power if the signal transmission strength of the terminal is less than the preset strength, wherein the third transmit power is higher than the first transmit power.

6. A wireless network device, comprising a first radio frequency (RF) circuit, a second RF circuit, and a processor, wherein:

the first RF circuit is configured to support a first frequency band;

the second RF circuit is configured to support a second frequency band, a quantity of non-overlapping channels in the first frequency band is less than a quantity of non-overlapping channels in the second frequency band;

the processor is configured to:
receive, in the first frequency band using the first RF circuit, a first probe request frame sent by a terminal, and receive, in the second frequency band using the second RF circuit, a second probe request frame sent by the terminal, and preferentially respond to the first probe request frame, using the first RF circuit at the first transmit power, if a signal transmission strength of the terminal is greater than a preset strength; and respond to the second probe request frame, using the second RF circuit at the second transmit power, if the signal transmission strength of the terminal is less than the preset strength, and wherein the first transmit power is lower than the second transmit power.

7. The wireless network device according to claim 6, wherein the processor is configured to respond to the first probe request frame, using the first RF circuit at the first transmit power, if the signal transmission strength of the terminal is greater than the preset strength and load in the first frequency band is less than a first preset threshold.

8. The wireless network device according to claim 6, wherein the processor is configured to respond to the second probe request frame, using the second RF circuit at the second transmit power, if the signal transmission strength of the terminal is less than the preset strength and load in the second frequency band is less than a second preset threshold.

9. The wireless network device according to claim 6, wherein the processor is further configured to:

select a terminal that supports the second frequency band and whose signal transmission strength is the smallest from terminals connected to the first frequency band, to put the terminal offline, when the load in the first frequency band is greater than or equal to the first preset threshold and the load in the second frequency band is less than the second preset threshold;

select a terminal that supports the first frequency band and whose signal transmission strength is the greatest from terminals connected to the second frequency band, to put the terminal offline, when the load in the second frequency band is greater than or equal to the second preset threshold and the load in the first frequency band is less than the first preset threshold;

respond to the second probe request frame, if the terminal is a terminal that is put offline in the first frequency band, when the first probe request frame of the terminal is received and the second probe request frame of the terminal is received; and respond to the first probe request frame, if the terminal is a terminal that is put offline in the second frequency band, when the first probe request frame of the terminal is received and the second probe request frame of the terminal is received.

10. The wireless network device according to claim 6, wherein the processor is further configured to:

respond to the first probe request frame at a third transmit power if the second probe request frame sent by the terminal in the second frequency band is not received, within a preset time period, after receiving the first probe request frame sent by the terminal, and the signal transmission strength of the terminal is less than the preset strength, wherein the third transmit power is higher than the first transmit power.

* * * * *